United States Patent [19]

Lenker et al.

[11] Patent Number: 4,516,385
[45] Date of Patent: May 14, 1985

[54] WRAPPING MACHINE

[75] Inventors: Don H. Lenker; Dennis F. Nascimento, both of Salinas, Calif.

[73] Assignee: The United States of America as represented by the Secretary of Agriculture, Washington, D.C.

[21] Appl. No.: 380,374

[22] Filed: May 20, 1982

[51] Int. Cl.³ .............................................. B65B 9/02
[52] U.S. Cl. ...................................... 53/504; 53/231; 53/550; 53/568
[58] Field of Search ................... 53/550, 568, 66, 230, 53/231, 504

[56] References Cited

U.S. PATENT DOCUMENTS 3,339,337 9/1967 Rapp et al. .............................. 53/550
3,449,889 6/1969 Molitor, Jr. ............................. 53/568
3,552,088 6/1971 Niwa .................................... 53/66 X Primary Examiner—James F. Coan
Attorney, Agent, or Firm—M. Howard Silverstein; David G. McConnell; Margaret A. Connor

[57] ABSTRACT

An apparatus for wrapping objects in heat-sealable film which provides for continuous mechanical wrapping of objects and which is suitable for wrapping objects which have poorly-defined shape or which are non-uniform in size or shape is described. The apparatus of the invention comprises a frame; a conveyor assembly for advancing the film and the object and for bringing the film into a wrapping relationship with the object; a sealing assembly for bringing the sides of the film having the object contained therein into heat-sealable contact and for sealing the film to sealably enclose the object; an indexing carriage for advancing the sealing assembly at the same rate as the conveyor assembly; and means for sensing the object and activating the sealing assembly to seal the film.

10 Claims, 9 Drawing Figures

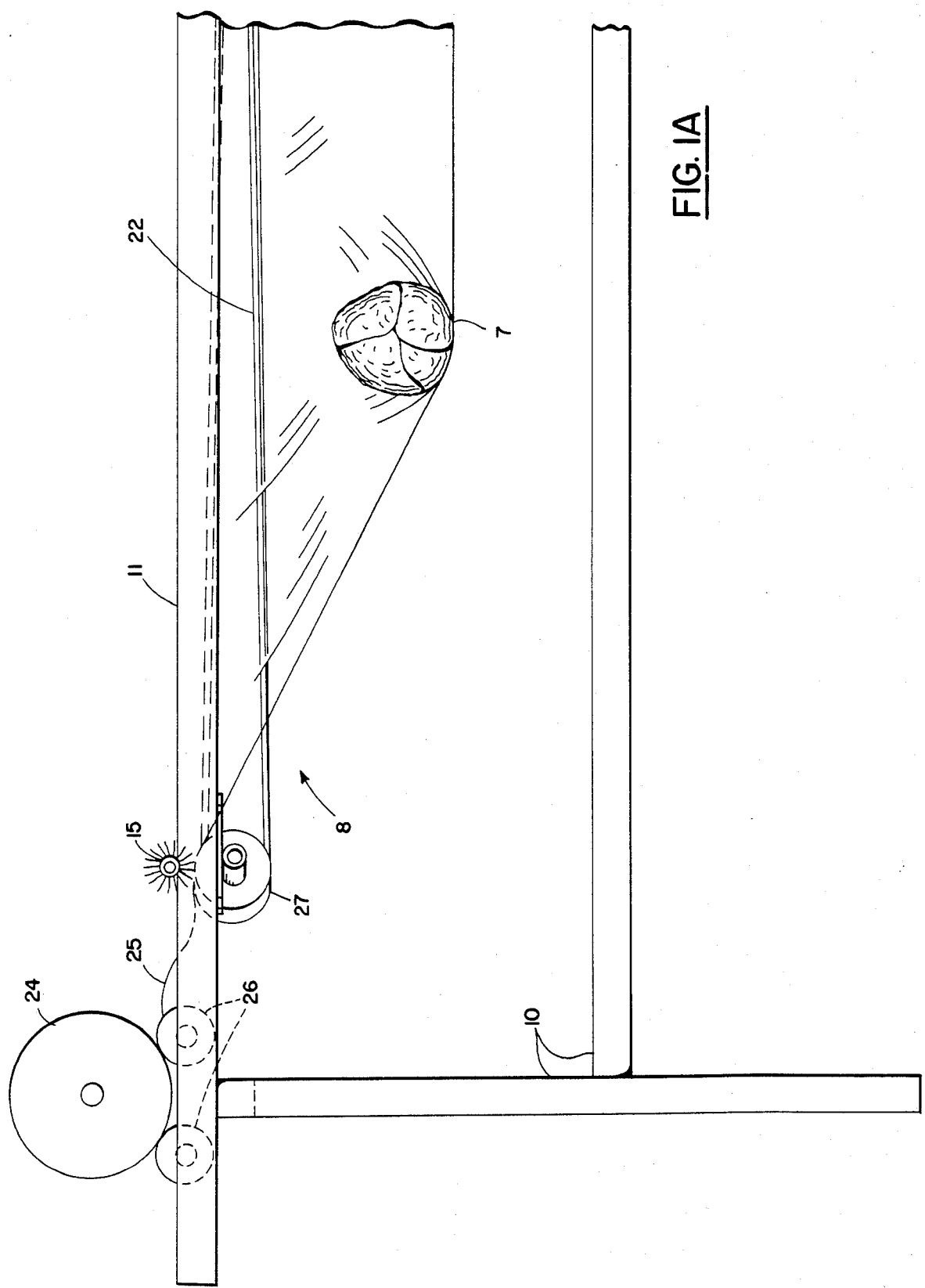
FIG. IA

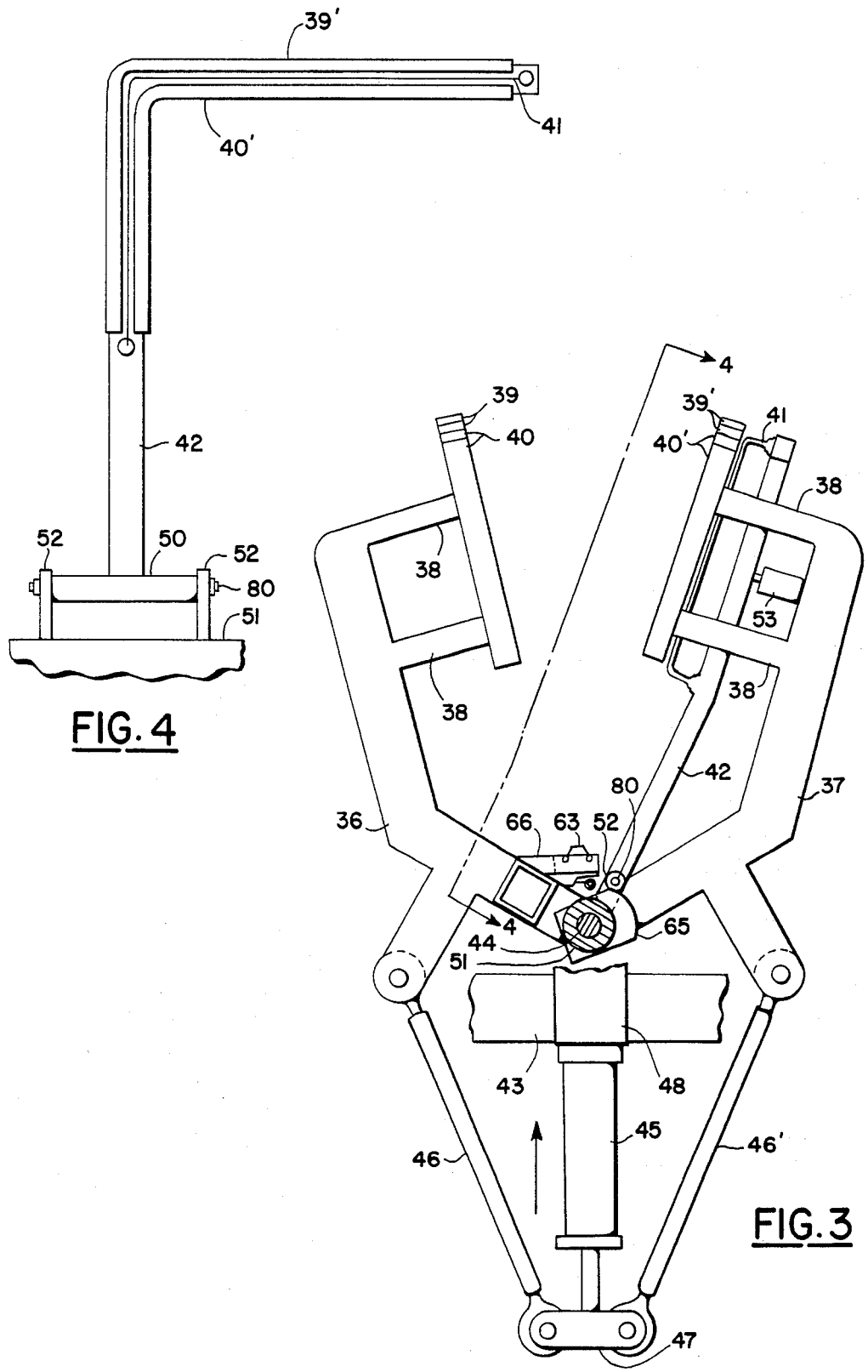

WRAPPING MACHINE

BACKGROUND OF THE INVENTION

1. Field of the Invention

This invention relates to and has among its objects the continuous mechanical wrapping of objects, particularly those having a poorly defined shape or which are non-uniform in size or shape.

2. Description of the Prior Art

A mechanical wrapper for wrapping an object in heat-sealable film is disclosed by Reid et al. (U.S. Pat. No. 3,466,844). In this apparatus a center-folded web of flexible heat-sealable film is intermittently fed forward in package length intervals, with a dwell between successive feed cycles. The film which has the center fold at the bottom is fed through a packaging station where an object is inserted and to a sealing station where means are provided for sealing the opposed walls of the material to enclose the object. The film is conveyed by side-conveyors which engage the outside walls of the film and a horizontal conveyor which supports the film and object.

Saraiski et al (U.S. Pat. No. 3,420,034) discloses a wrapping machine wherein an article is placed in supported, center-folded heat-sealable film, the film is drawn tightly against the article and sealed. Hansen et al (U.S. Pat. Nos. 3,466,840 and 3,505,780) disclose a wrapping machine for wrapping articles such as food stuffs in heat sealable film, wherein the article is placed on a shallow tray and then film is folded about the article and heat sealed. U.S. Pat. No. 4,179,867 granted to Bodalay shows a packaging machine for fabricating individual bag-like containers from a continuous web of film. This device includes web carrier means comprising belts having fingers to supportingly engage the film and convey it to filling and sealing stations.

Characteristic problems of the aforementioned wrapping machines are that they wrap objects of a particular size and shape and thus are poorly adapted for wrapping poorly defined or odd-shaped objects such as lettuce, cauliflower and cabbage or series of foodstuffs such as bunches of carrots or turnips unless the object or series of objects is placed in a tray. Furthermore, the conveyance of the wrapping material is intermittent, being halted during the sealing process, thereby resulting in loss of efficiency of operation.

SUMMARY OF THE INVENTION

We have discovered an apparatus for wrapping objects in heat-sealable film which provides for continuous mechanical wrapping of objects which have a poorly-defined shape or which are non-uniform in size or shape.

The apparatus of the invention comprises a frame; a conveyor assembly for advancing the heat-sealable film and the object and for bringing the film into a wrapping relationship with the object; a sealing assembly for bringing the sides of the film having the object contained therein into heat-sealable contact and for sealing the film to sealably enclose the object; an indexing carriage for advancing the sealing assembly at the same rate as the conveyor assembly; and means for detecting the object and activating the sealing assembly to sealably enclose the object.

An important advantage of the apparatus is the novel feature of continuous conveyance of the film with the object contained therein during the sealing operation. Prior art wrapping devices intermittently feed film, stopping the film conveyance during the sealing operation. The continuous conveyance of the instant invention results in increased wrapping capacity and efficiency over the prior art devices.

Another important advantage of the invention is that objects having poorly defined shape or which are non-uniform in size or shape such as heads of lettuce, cauliflower and cabbage or groups of objects such as carrots, turnips and the like can be mechanically wrapped without first being placed in a tray or box. Elimination of of the tray reduces both the cost and labor of wrapping.

Another advantage of the invention is that the object to be wrapped is placed directly onto the film and not transferred from one conveyor to another or conveyed across the film surface. This is particularly important in the wrapping of vegetables having loose outer leaves such as lettuce and cauliflower because such transfers cause the outer leaves to loosen and separate from the head thereby damaging the produce. Loose leaves can also interfere with the sealing process. The wrapping machine of the invention maintains the integrity of such objects by eliminating these transfers.

Wrapping of lettuce is important because wrapped lettuce is easier to handle and damaged less during shipping than unwrapped lettuce. Presently, no apparatus for mechanically wrapping lettuce is commercially available and hand wrapping is labor intensive. The apparatus described herein provides a solution to the problem of mechanically wrapping lettuce.

Another important advantage of the invention is the provision of a sensing mechanism which detects the object to be wrapped and activates the sealing assembly. In this way, the latter operates only as needed to heat-seal an object.

BRIEF DESCRIPTION OF THE DRAWINGS

FIG. 1a is a front view of the film feed end of the wrapping machine of the invention.

FIG. 3 is a detailed view of the sealing assembly taken on the line 3—3 of FIG. 1.

FIG. 4 is a detailed view of the seal wire arm taken on the line 4—4 of FIG. 3.

DETAILED DESCRIPTION OF THE INVENTION

The wrapping machine of the invention will next be described in reference to the drawings.

Figure 1B:
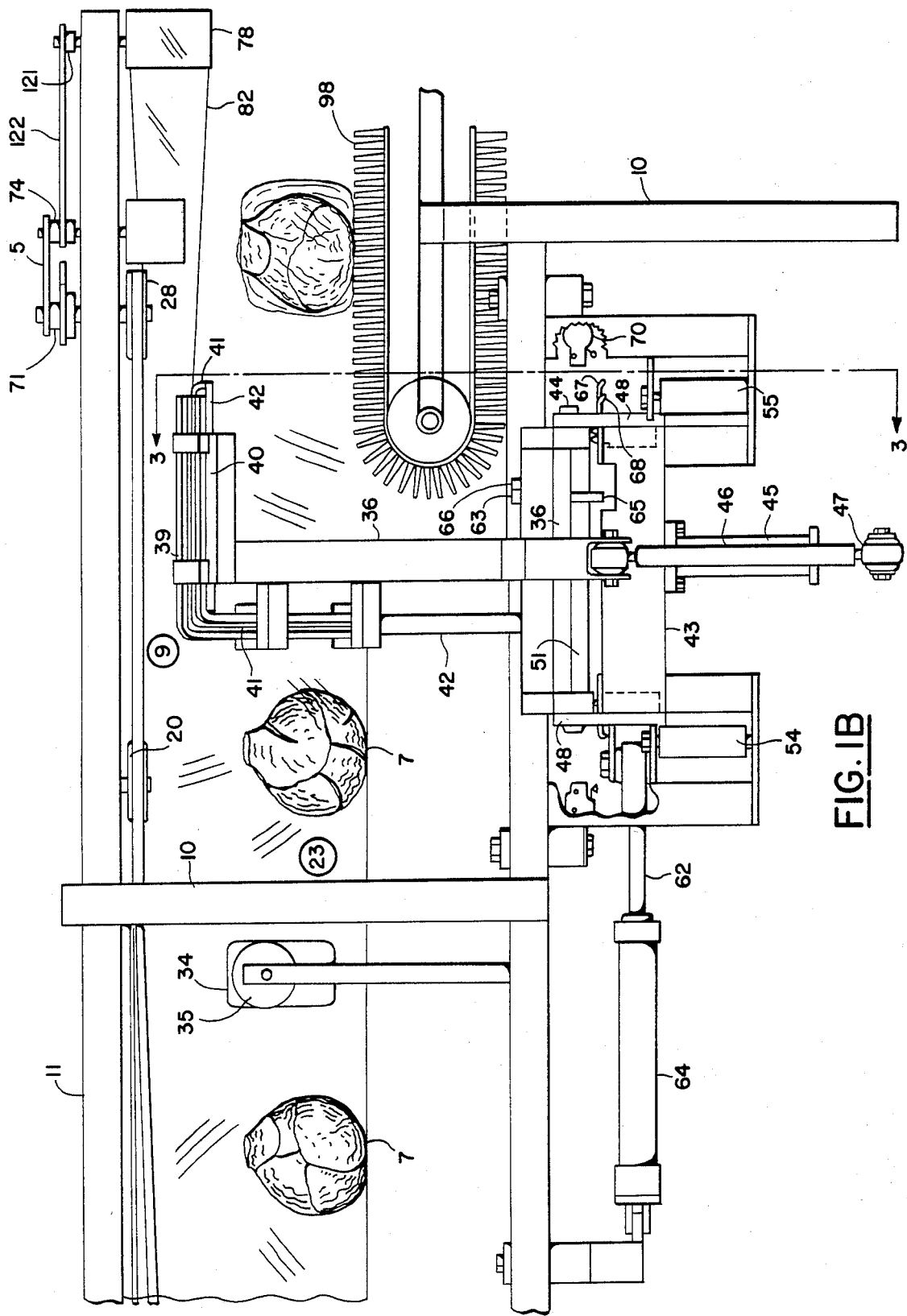
FIG. 1b is a front view of the sealing end of the wrapping machine.
Figure 2:
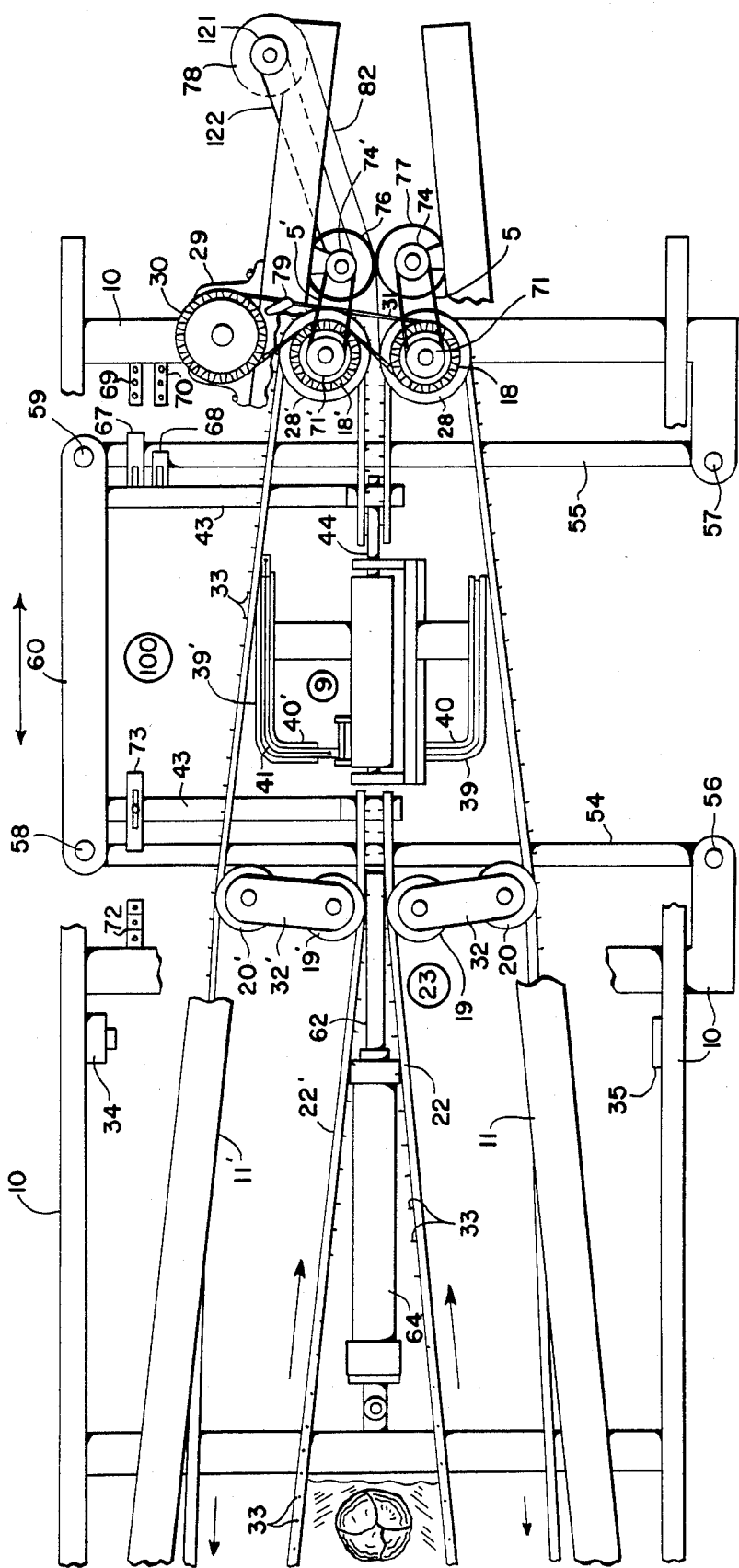
FIG. 2 is a somewhat simplified top view of the sealing end of the wrapping machine.

Referring to FIGS. 1a, 1b and 2, the apparatus for wrapping objects in heat-sealable film is comprised generally of main frame 10, conveyor assembly 8 and sealing assembly 9.

Frame 10 includes V-positioned longitudinal members 11 and 11'. Conveyor assembly 8 comprises endless belts 22 and 22' which convey the film by means of brads 33 affixed to the belts. Belts 22 and 22' are rotatively supported by V-positioned frame members 11 and 11' so so that the belts converge in the area (23) adjacent to the sealing assembly. Supply roll 24 of heat-sealable film 25 is supported on film conveyor rollers 26 which are rotatively journaled to main frame members 11 and 11' at the film feed end. Converging belts 22 and 22' are trained over opposed pulleys 27 and 27' (not shown) rotatively mounted to members 11 and 11' at the film feed end, and over drive pulleys 28 and 28', rotatively mounted on members 11 and 11' at the opposite end of the apparatus. Pulleys 28 and 28' are driven by motor 29 via sprockets 30, 18 and 18' and roller chain 31. Sprocket 30 is fitted with magnetic teeth which are sensed by magnetic pickup 79 as described in further detail below. Brushes 15 and 15' (not shown) are rotatively mounted on members 11 and 11' above rollers 27 and 27' to push the film onto the brads.

Guide rollers 19 and 19' are rotatively mounted on brackets 32 and 32' affixed to frame 11 and 11' respectively in area 23 adjacent to the sealing assembly to guide converging belts 22 and 22' and cause them to converge in area 23. As the belts and film travel toward sealing assembly 9, the film edges converge and form a trough into which the object to be wrapped (7) shown here as a lettuce head is placed. Guide rollers 19 and 19' cause the converging belts to converge further thereby bringing the opposing sides of the film trough at or near the upper edges into close proximity in area 23. Rollers 20 and 20' rotatively mounted on brackets 32 and 32' guide belts 22 and 22' back to pulleys 27 and 27' at the feed end of the apparatus.

Photo-detector 34, affixed to the main frame in the area adjacent to the sealing assembly, comprises a commercially available Light Emitting Diode (LED) and photodiode. Reflector 35 is located on the main frame member directly opposite to photo-detector 34.

The sealing assembly is mounted on subframe 43 which is part of indexing carriage 100. Carriage 100 further comprises parallel link members 54 and 55 which are pivotally connected to main frame 10 through pins 56 and 57 and pivotally linked to one another through tie bar 60 by means of pins 58 and 59 to form a parallel linkage assembly which allows indexing carriage 100 and the sealing assembly to move in a path substantially parallel with the film as shown by the double-headed arrow in FIG. 2. Carriage 100 is driven by cylinder rod 62 of hydraulic cylinder 64 which is pivotally attached to frame 10. The cylinder is controlled by microswitches 70 and 72 attached to frame 10 as actuated by cams 68 and 73 respectively in response to movement of subframe 43 to which they are affixed.

Sealing assembly 9 is described in reference to FIGS. 3 and 4. Seal arms 36 and 37 are arranged to pivot on shaft 44 between an open and closed position. L-shaped seal bars 39 and 40 and 39' and 40' are supported by seal arms 36 and 37, respectively, by means of protruding extensions 38 of arms 36 and 37. Rotation of the arms toward one another causes the bars to come together, that is, when the arms are in the closed position, seal bar 39 on arm 36 abuts seal bar 39' on arm 37, and seal bar 40 abuts seal bar 40' so that the sides of film 25 peripheral to the object are in heat-sealable contact. The spacing between abutting 39–39' and 40–40' is sufficent to allow heated L-shaped seal wire 41 to pass through. Shaft 44 is affixed to the upper side of subframe 43 by means of subframe member 48. Hydraulic cylinder 45 acting against the lower side of subframe 43 drives arms 36 and 37 via connecting rods 46, 46' and tie bar 47. Seal wire support arm 42 is affixed to journal 50 which is rotatively attached to shaft 80 which is affixed to journal 51 by means of end plates 52. Journal 51 is affixed to seal arm 37. Seal wire 41 is supported by seal wire support arm 42 to move therewith as journal 51 rotates about shaft 44. Solenoid 53 is affixed to seal arm 37 and seal wire support arm 42. The movement of the seal wire through the abutting seal bars is controlled by microswitch 63 attached to arm 36 through microswitch support 66 and cam 65 attached to journal 51.

Referring to FIGS. 1b and 2, film selvage cut off by the seal wire is rolled up by rollers 76, 77, and 78. Rollers 76 and 77 are rotatably connected to V-members 11 and 11' in the area immediately following the sealing assembly and are driven by sprockets 71, 71' and 74 and 74' which are connected by roller chains 5 and 5'. Roller 78 is rotatably mounted to frame 11' and driven by drive comprised of sprockets 74' and 121 and roller chain 122. Conveyor 98 which has extending fingers is supported by frame 10 to carry the wrapped objects from the wrapping machine.

Figure 5:
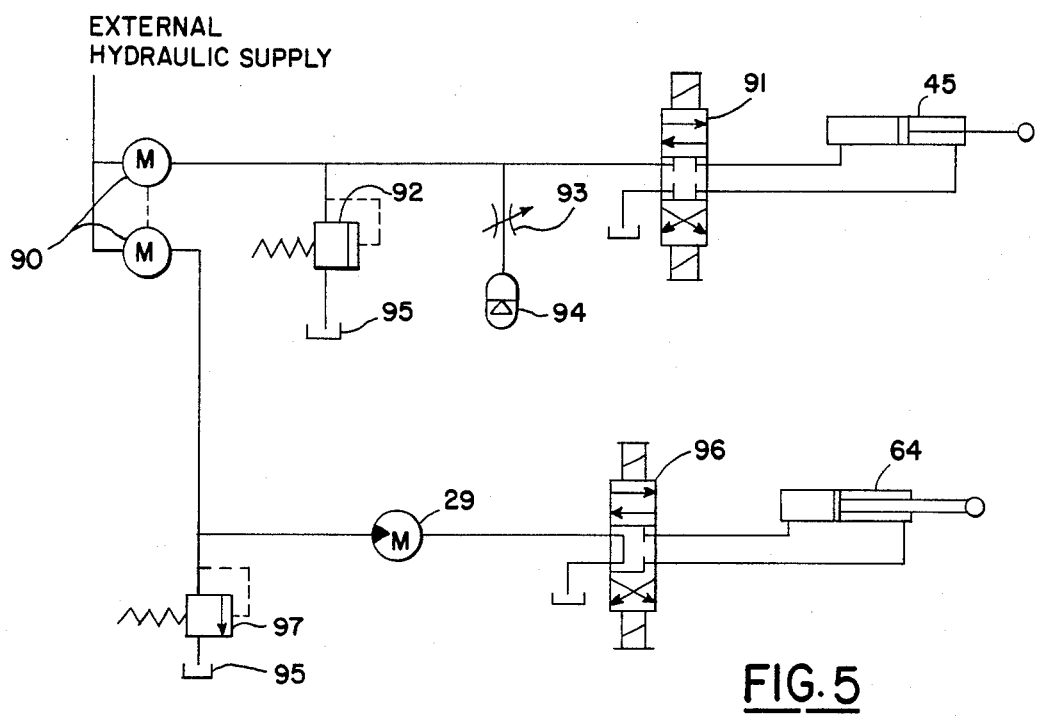
FIG. 5 is a schematic diagram of the hydraulic circuit.

It is a critical feature of the invention that the movement of indexing carriage 100 in the direction of film 25 be at the same rate as the movement of the film conveyed by conveyor belts 22 and 22' to prevent the sealing bars from pulling and tearing the film while it is being sealed and to provide for continuous movement of the film during the sealing operation. This is done by means of the hydraulic circuit shown in FIG. 5. The hydraulic circuit powers the parallelogram linkage assembly, seal arms 36 and 37 and motor 29 which controlls the rate of movement of converging belts 22 and 22'. Hydraulic fluid from an external source is supplied to motors 90 whch are mechanically tied together. The fluid flow is divided in two with half going to power seal arm cylinder 45 by means of solenoid-actuated directional control valve 91. Relief valve 92 bypasses excessive oil to tank 95 in order to limit the maximum pressure of this part of the circuit. Accumulator 94 stores oil at a high pressure and restrictor 93 restricts the flow of oil out of accummulator 94. The other half of the hydraulic fluid powers subframe cylinder 64 through solenoid-actuated directional control valve 96 and also powers converging belt motor 29. Relief valve 97 bypasses oil to tank 95 in this circuit to limit the maximum pressure.

OPERATION OF THE INVENTION

In operation, flexible heat-sealable film 25 supplied by roll 24 impinges on brads 33 affixed to converging belts 22 and 22'. Brushes 15 and 15' push the film edges onto the brads. Motor 29 drives the flexible converging belts and the attached film so that the film is conveyed from the roll to the sealing assembly area. As the film and converging belts travel toward the sealing area, the sides of the film converge to form a trough open at the top into which the object to be wrapped (7) is placed. The object is supportingly conveyed by the film, and as the belts and the film edges affixed thereto continue to converge, the film is brought around and over the object enclosing the article peripherally, and forming a wrapping relationship with the object.

Guide rollers 19 and 19' bring the edges of the film which peripherally enclose the object into close proximity in area 23 adjacent to the sealing assembly so that they can be sealed. As the object to be wrapped is conveyed past photo-detector 34, the photo-detector detects the object and electronically actuates magnetic pickup 79 which magnetically counts the magnetic teeth on sprocket 30. After a preset number of teeth are counted, solenoid-activated directional control valves 91 and 96 in hydraulic circuit (FIG. 5) are actuated. Valve 91 causes hydraulic seal arm cylinder 45 to move in the direction of the arrow shown in FIG. 3 which by means of connecting rods 46 and 46' causes arms 36 and 37 and affixed L-shaped seal bars 39 and 40 and 39' and 40' to pivot about shaft 44 towards each other until seal bar 39 abuts seal bar 39' and 40 abuts 40' thereby bringing the two sides of the film trough into contact directly above and behind the object so that the film is in a heat-sealable relationship with the object. It is preferable that oil from accumulator 94 augment the steady flow of oil from motor 90 to cause cylinder 45 to move so as to cause the seal bars to come together quickly thereby maximizing the time for the hot wire to seal the film during the sealing cycle. Restrictor 93 prevents the seal bars from moving so fast as to cause mechanical damage to the mechanism.

Valve 96 causes hydraulic cylinder rod 62 to extend thereby moving subframe 43 in the same direction as the film. Cylinder 64, hydraulic motor 30 and drive comprised of sprockets 30, 18 and 18' and pulleys 28 and 28' must be sized to cause subframe 43 to move at the same speed as film 25. Sizing these components is obvious to those skilled in the art. Since hydraulic fluid to cylinder 64 controls both the rate of movement of subframe 43 and powers motor 29, the rate of advance of indexing carriage 100 will be the same as the rate of movement of the film at all speeds. In this way the film is continuously conveyed during the sealing process without the seal bars pulling or tearing the film.

Figure 6:
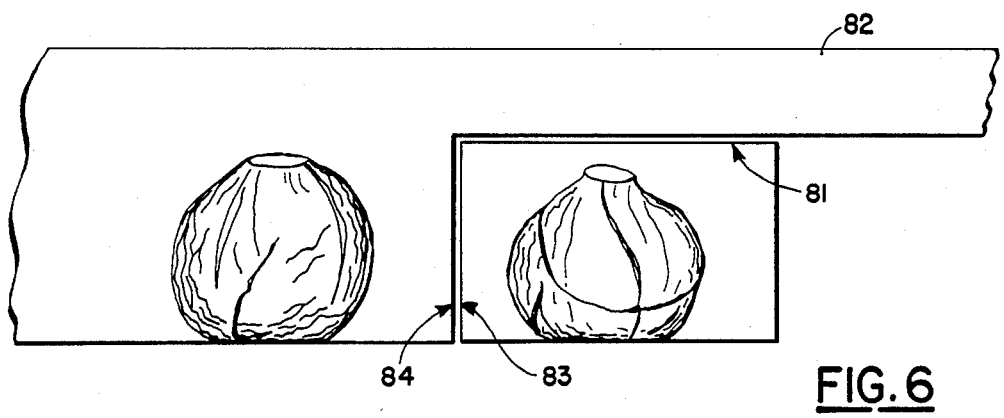
FIG. 6 depicts the sealing pattern.

The closing of the seal arms causes cam 65 to actuate microswitch 63 which applies power to solonoid 53 thereby causing seal wire support arm 42 to pivot about shaft 80 so that heated seal wire 41 passes through the L-shaped slot formed by abutting seal bars 39-39' and 40-40' and heat-seals the film in an L-shape. Wire 41 is heated by electric resistance heating. Other heating methods will be obvious to those skilled in the art. Referring to FIG. 6, the vertical portion of the bars seals the two sides of the trough together in area 83 behind the object being sealed and in area 84 in front of the next object to be sealed. The horizontal portion of the heated seal wire 41 seals area 81 over the top of object. The horizontal section of the wire also cuts off selvage strip 82 which is pulled off brads 33 by rollers 76 and 77 and rolled onto roller 78. The positioning of seal wire support arm 42 attached to arm 37 is such that it moves on a radius so that the solonoid-activated seal wire 41 passes through the slot by the abutting seal bars.

Subframe 43 continues in the direction of travel of the film until cam 67 contacts and actuates microswitch 69 causing cylinder 45 to be actuated in the reverse direction so arms 36 and 37 return to the starting (open) position. Augmentation of the oil flow by accumulator 93 again causes the arms to return to the starting position quickly. The forward most movement of the subframe also causes cam 68 to contact and actuate microswitch 70 causing cylinder 64 to be actuated in the reverse direction. Movement of the subframe back toward its starting position causes cam 73 to actuate microswitch 72. Microswitch 72 deactivates hydraulic valves 91 and 96 allowing them to return to their neutral position and stopping subframe 43. The sealing assembly is now back to the starting position ready to seal the next object.

Figure 7:
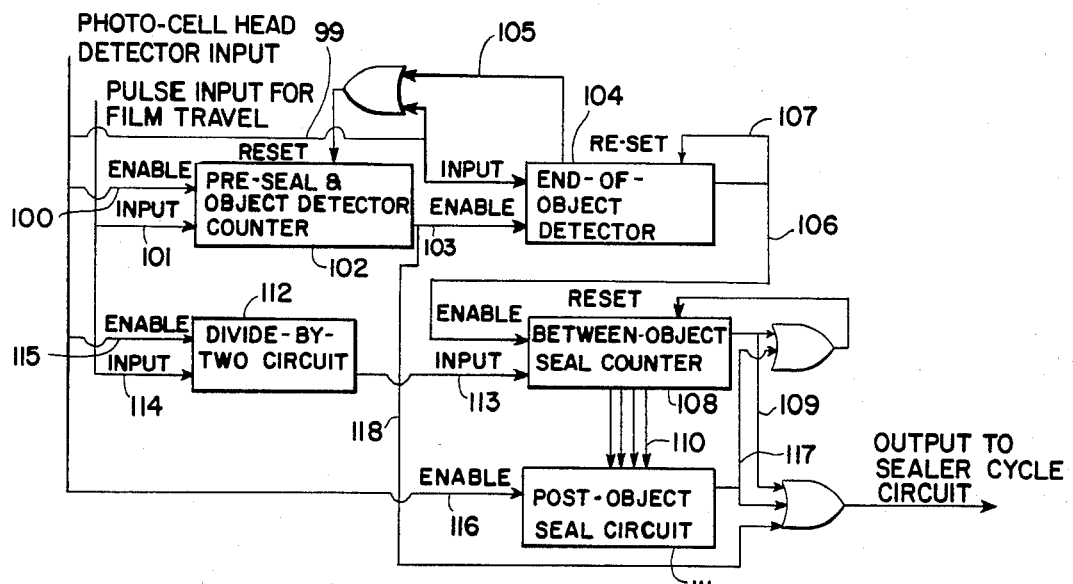
FIG. 7 is a block diagram of the circuit for actuating the sealing assembly.

In an alternate embodiment of the invention, inputs from photodetector 34 and from magnetic pickup 79 control seal arms 36 and 37 by means of circuitry shown in FIG. 7. In this embodiment, the seal bars are actuated to close and seal in one of three ways: if the object to be sealed is the first object detected by the photodetector, the arms are caused to close so that they seal in front of the object, that is, the vertical portion of the L is in the front of the object being sealed; if the object to be sealed is one of a series, i.e., another object was sealed prior and the seal circuit is in a sealing cycle, the seal circuitry causes the seal arms to seal with the vertical portion of the L substantially midway between the two objects; if the object is the last of the objects to be sealed, that is, no other object is detected by the photodetector for a predetermined period of time, the seal arms are actuated so that the vertical portion of the L seals behind the last object.

Figure 8:
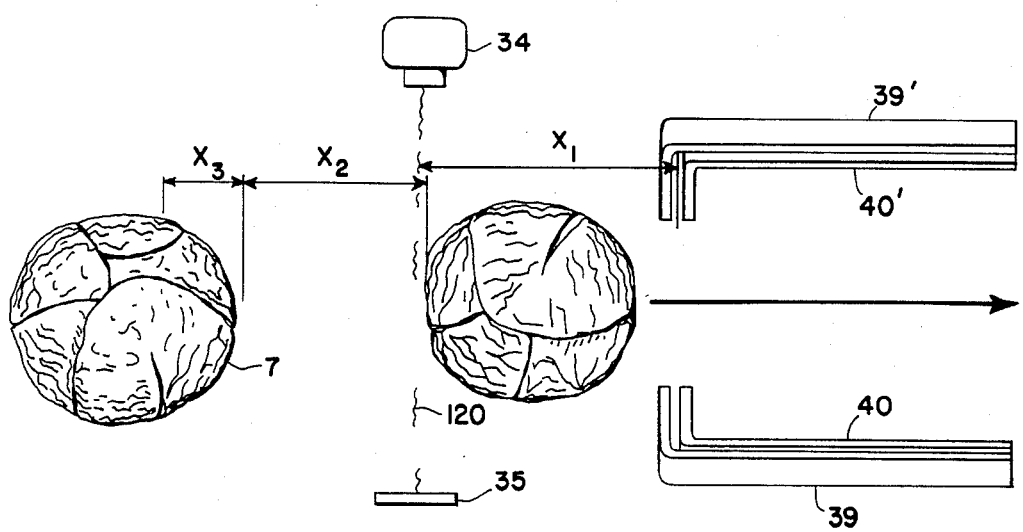
FIG. 8 is a diagram showing the relationship of the seal bars, photodetector and object to be wrapped.

Referring to FIGS. 7 and 8, when an object is detected by photodetector 34, that is, when the light beam is broken due to an object passing in front of the beam, input from the photodetector via 100 activates (enables) pre-seal and object-detector counter 102 to start counting the pulses transmitted from magnetic pickup 79 via 101. The counter is set to count a particular number of counts; one criteria to determine the number set is that it must be large enough to insure an object has passed in front of the light beam. A second criteria for this number is that the vertical portion of the seal bars seal in front of and/or behind the object as discussed in further detail below. Once the set number of counts has been reached, output from counter 102 via 103 activates end-of-object detector 104. Where reflection of the film or dust on the film momentarily breaks the light beam, the count is not reached to activate the seal arms and counter 102 is disabled and set back to zero. Once output from counter 102 activates end-of-object detector 104, output is sent via 105 to reset counter 102. The end-of-object detector 104 detects via 99 when the object has passed out of the light beam (as signified by a voltage drop) and transmits output via 106 to enable between-object seal counter 108 and resets itself via 107.

The seal bars seal in front of an object as follows. When preseal and object-detector counter 102 has detected an object, counter 102 immediately sends output to the seal cycle circuit via 118 at the same time as end-of-object detector is enabled via 103. If the sealer is in a cycle, that is, is making a seal, then the signal is ignored. If the sealer cycler circuit has not been activated, for example, if the object detected is the first object in a series or the first in a long gap between objects, then output from 102 causes the sealer to be actuated and immediately make a seal. The spacing between photo-detector 34 and the seal bars and the counter setting of counter 102 is such that the vertical portion of the seal bars seals in front of the object.

Once between-object seal counter 108 is activated, output to activate the sealer circuit is transmitted by one of two routes—either by between-object seal counter via 109 or by post-object seal circuit via 117. The route by which the sealer cycle circuit is activated depends on the enable input 116 to the post-object seal circuit. Circuit 112 transmits different output depending on whether photodetector 34 is between two objects or whether the photodetector has detected the last object to be sealed. When an object is detected by photodetector 34, divide-by-two circuit 112 is disabled and every pulse received from magnetic pickup 79 via 114 is transmitted by the divide-by-two circuit. When the light beam is not broken, for example, when the photodetector is detecting the space between two objects, then the divide-by-two-circuit is enabled via 115 and for every other input pulse an output pulse is transmitted via 113 to between-object seal counter 108. The between-object seal counter counts the pulses from the divide-by-two circuit and if it reaches the preset count, that is the count which will cause the vertical portion of the seal bars to be substantially centered between objects, it transmits output to the sealer cycle circuit via 109, to cause the seal arms to close and seal between the objects.

Post-object seal circuit 111 is enabled via 116 when the light beam is not broken. If circuit 111 is enabled, it moniters the count of between-object seal counter 108. If a certain count is reached before an object comes into the beam and disables circuit 111, then post-head seal circuit 111 transmits output via 117 to the sealer cycle circuit to seal behind the object. This certain count is such that, if objects are regularly spaced, circuit 111 will be disabled by the approaching object before the certain count is reached. Also, this certain count must always be less than the count of the between-object sealer counter. Post-object seal circuit 111 activates the seal bars to seal after the last object in a series or after the object where there is a large gap before the next object. If an object is detected by the photodetector before the count is reached which triggers post-head seal circuit 111, then circuit 111 is disabled and between-object counter 108 counts every pulse because divide-by-two circuit 112 is also disabled. If the post-object seal circuit causes the sealer circuit to seal, then it also resets between-object seal counter 108 via 117.

Referring to FIG. 8, the sealing circuit seals between the objects according as follows: the optimum delay distance, $X_O$, to seal exactly between two objects is given by the equation $$X_0 = X_1 + \frac{X_2}{2} \quad (1)$$

where $X_1$ is a constant equal to the distance between the starting position of the seal bars and photodetector 34; $X_2$ is a variable equal to the distance between objects during which light beam 120 is unbroken.

The actual delay distance, $X_a$, that is the delay distance created by between-object seal counter 108 can be divided into the two parts shown by the equation $$X_a = X_2 + X_3 \quad (2)$$

where $X_2$ is defined as above and $X_3$ is the portion of the delay distance when an approaching object is breaking the light beam.

The number of pulses, $N_3$, from magnetic pickup 79 received by between-object seal counter 108 while the light beam is broken is given by the equation $$N_3 = \frac{X_3}{X_p} \quad (3)$$

where $X_p$ is the distance the film travels during each magnetic pulse transmitted by magnetic pickup 79. Solving the equation for the delay distance generated while the light beam is broken, $X_3$, results in the equation $$X_3 = N_3 X_p \quad (4)$$

Since only alternate pulses are transmitted by the divide-by-two circuit when the light beam is unbroken (i.e., between objects), the number of pulses received by the between-object seal counter 108 between objects is given by the equation $$N_2 = \frac{X_2}{2X_p} \quad (5)$$

Because the total pulses during the two parts of the delay must equal the between object counter setting N, then $N_3$, the number of pulses received by the counter while the light beam is broken, is determined by the equation $$N_3 = N - N_2 \quad (6)$$

$$\text{if } N \geq N_2 \quad (7)$$

Substituting equation 5 into equation 6, then the resulting equation into equation 4 and that result into equation 2, the following equation is obtained $$X_a = X_2 + X_p \left( N - \frac{X_2}{2X_p} \right) \quad (8)$$

Setting the equation for $X_a$ equal to the equation for $X_O$ and solving for N results in $$N = \frac{X_1}{X_p} \quad (9)$$

Substituting equation 5 and 9 into inequality 7 and simplifying results in $$X_2 \leq 2 X_1 \quad (10)$$

If N is set according to equation 9 and inequality 10 is not violated the sealing bars will be centered between each two objects.

If there is a large gap between objects or after the last object (that is, inequality 10 is violated) the count, N, will be reached while the light beam is between objects and the sealers bars will not be centered between objects. The maximum gap between objects in which the seal will be centered can be changed by adjusting $X_I$.

What is claimed is:

1. An apparatus for the continuous wrapping of objects in heat-sealable film which is particularly adapted for the wrapping of three-dimensional objects which have a poorly-defined shape or which are non-uniform in size or shape, comprising:
   (a) a frame;
   (b) a conveyor assembly for advancing the film and the object and for bringing the film into a wrapping relationship with the object, wherein said conveyor assembly comprises V-positioned endless belts which converge adjacent to the area where the film is sealed, said belts having brads affixed thereto to advance the film so that the edges of the film converge and the center portion of the film sags downward to form a V-shaped trough adapted to contain three-dimensional objects which have poorly-defined shape or which are non-uniform in size or shape, and so that the edges of the film further converge to wrap the film peripherally about the object;

(c) a sealing assembly for bringing the sides of the film containing the object into a heat-sealable relationship and for sealing the film to sealably enclosed the object;

(d) an indexing carriage for advancing said sealing assembly at the same rate as said conveyor assembly; and (e) means for detecting the object and actuating said sealing assembly to seal the film while the film is advancing.

2. The apparatus of claim 1 further comprising means for rolling up film selvage cut off by said sealing assembly.

3. The apparatus of claim 1 wherein said sealing assembly comprises:

opposing arms having L-shaped seal bars attached thereto, said arms pivoting to cause said seal bars to come together and clamp the film, wherein the horizontal portion of the seal bars during sealing is positioned so as to seal the film above the object and the vertical portion of the bars is positioned to seal the film between adjacent objects; and a heated wire which passes between said clamped seal bars to heat-seal the film.

4. The apparatus of claim 1 wherein said indexing carriage comprises a subframe having parallel link members which are pivotally connected to said main frame to advance and return said carriage, said subframe powered so that it advances at the same rate as the film.

5. An apparatus for wrapping objects in heat-sealable film, comprising:

(a) a frame;

(b) a conveyor assembly for advancing the film and the object and for bringing the film into a wrapping relationship with the object;

(c) a sealing assembly for bringing the sides of the film containing the object into a heat-sealing relationship and for sealing the film to sealably enclose the object;

(d) an indexing carriage for advancing said sealing assembly at the same rate as said conveyor assembly;

(e) a magnetic pickup which causes said sealing assembly to seal the film; and (f) a photodetector for detecting the object and actuating said pickup to cause said sealing assembly to seal the film while the film is advancing.

6. The apparatus of claim 5 wherein said means for detecting the object and actuating said sealing assembly is responsive to the spacing of said objects.

7. The apparatus of claim 5 wherein said sealing assembly comprises (1) opposing arms having L-shaped seal bars attached thereto, said arms pivoting to cause said seal bars to come together and clamp the film, whrein the horizontal portion of the seal bars during sealing is positioned above the object and the vertical portion of the bars is positioned between adjacent objects; and (2) a heat wire which passes betweeen said clamped seal bars to seal the film.

8. The apparatus of claim 7 wherein said photodetector detects the objects and actuates said sealing assembly to cause the vertical portion of the L-shpaed seal bars to seal substantially midway between adjacent objects.

9. The apparatus of claim 5 wherein the photodetector detects the object and atucates said pickup to cause the sealing assembly to seal in front of the object.

10. The apparatus of claim 5 wherein said conveyor assembly comprises V-positioned endless belts which converge adjacent to the area where the film is sealed, said belts having brads affixed thereto to advance the film so that edges of the film converge and the center portion of the film sags downward to form V-shaped trough adapted to contain three-dimensional objects which have poorly-defined shape or which are nonuniform in size or shape, and so that the edges of the film further converge to wrap the film peripherally about the object.

* * * * *